(12) United States Patent
Yasuda et al.

(10) Patent No.: US 12,117,788 B2
(45) Date of Patent: Oct. 15, 2024

(54) CONTROL DEVICE WITH SECOND PROCESSING UNIT THAT ACCESSES VARIABLE VIA FIRST PROCESSING UNIT

(71) Applicant: OMRON Corporation, Kyoto (JP)

(72) Inventors: Kei Yasuda, Kyoto (JP); Taku Oya, Kyoto (JP); Hidehiko Sekimoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 316 days.

(21) Appl. No.: 17/771,449

(22) PCT Filed: Oct. 21, 2020

(86) PCT No.: PCT/JP2020/039564
§ 371 (c)(1),
(2) Date: Apr. 22, 2022

(87) PCT Pub. No.: WO2021/095466
PCT Pub. Date: May 20, 2021

(65) Prior Publication Data
US 2022/0397880 A1    Dec. 15, 2022

(30) Foreign Application Priority Data
Nov. 12, 2019  (JP) ................. 2019-204825

(51) Int. Cl.
*G05B 19/042*    (2006.01)
*B25J 9/16*    (2006.01)

(52) U.S. Cl.
CPC ........ *G05B 19/0423* (2013.01); *B25J 9/1682* (2013.01); *G05B 2219/23328* (2013.01); *G05B 2219/25174* (2013.01)

(58) Field of Classification Search
None
See application file for complete search history.

(56) References Cited

U.S. PATENT DOCUMENTS 5,555,179 A     9/1996 Koyama
5,984,499 A *  11/1999 Nourse .................. G06F 9/545
                                                                        718/107

(Continued)

FOREIGN PATENT DOCUMENTS

CN    109491307 A    3/2019
JP    H0772920 A    3/1995

(Continued)

OTHER PUBLICATIONS

International Search Report issued in International Appln. No. PCT/JP2020/039564 mailed Dec. 28, 2020. English translation provided.

(Continued)

*Primary Examiner* — Bernard G Lindsay
(74) *Attorney, Agent, or Firm* — ROSSI, KIMMS & McDOWELL LLP

(57) ABSTRACT

A control device includes a first processing unit and a second processing unit. One processing unit of the first processing unit and the second processing unit is configured to retain a predetermined variable available in both a calculation by the first processing unit and a calculation by the second processing unit, and the other processing unit of the first processing unit and the second processing unit is configured to access the predetermined variable via the one processing unit.

3 Claims, 6 Drawing Sheets

(56) References Cited

U.S. PATENT DOCUMENTS

| | | | |
|---|---|---|---|
| 2014/0005835 A1 | 1/2014 | Nishiyama et al. | |
| 2016/0291581 A1* | 10/2016 | Eguchi | G05B 19/4155 |
| 2017/0076194 A1* | 3/2017 | Versace | G06N 3/02 |
| 2018/0065244 A1* | 3/2018 | Jakunen | G05B 19/4148 |
| 2019/0049925 A1 | 2/2019 | Shimamura et al. | |
| 2019/0079499 A1 | 3/2019 | Yamamoto et al. | |
| 2019/0079500 A1 | 3/2019 | Nakano et al. | |
| 2019/0369588 A1 | 12/2019 | Amano et al. | |
| 2021/0026316 A1* | 1/2021 | Imai | G06F 9/50 |

FOREIGN PATENT DOCUMENTS

| | | |
|---|---|---|
| JP | H11288304 A | 10/1999 |
| JP | 2012194662 A | 10/2012 |
| JP | 2018180706 A | 11/2018 |
| JP | 2018185772 A | 11/2018 |
| JP | 2019036043 A | 3/2019 |

OTHER PUBLICATIONS

Written Opinion issued in International Appln. No. PCT/JP2020/039564 mailed Dec. 28, 2020. English translation provided.
Office Action issued in Chinese Appln. No. 202080073707.9, mailed Feb. 28, 2024. English translation provided.
Extended European Search Report issued in European Appln. No. 20887884.3, mailed Sep. 29, 2023.

* cited by examiner

FIG. 3

| Variable on control application processing unit side | Variable on IEC program processing unit side |
|---|---|
| rob_var1 | plc_var1 |
| rob_var2 | plc_var2 |
| rob_var3 | plc_var3 |

CONTROL DEVICE WITH SECOND PROCESSING UNIT THAT ACCESSES VARIABLE VIA FIRST PROCESSING UNIT

TECHNICAL FIELD

The present invention relates to a control device for controlling a plurality of controlled objects.

BACKGROUND ART

In various production sites, factory automation (FA) technology using a control device such as a programmable logic controller (PLC) is widely used. Such a control device not only directly controls a controlled object, but also indirectly controls a controlled object by giving a control command to another device in some cases. In addition, there is a need to consolidate a plurality of dedicated devices used to implement a control system into a smaller number of control devices. For example, in the technique disclosed in Patent Document 1, a CPU unit of a PLC executes a motion calculation program and a user program in synchronization.

Patent Document 2 discloses a technique for achieving, by a single control device, control calculations according to a plurality of types of programs in different executable forms. The technology employs a configuration in which, for example, respective command values are calculated according to a program that is executed as a whole in each control cycle and a program that is sequentially executed according to an intermediate code generated by interpreting a part of the program. In the configuration, the command values are output together in each control cycle.

PRIOR ART DOCUMENTS

Patent Documents

Patent Document 1: Japanese Unexamined Patent Publication No. 2012-194662
Patent Document 2: Japanese Unexamined Patent Publication No. 2019-36043

SUMMARY OF THE INVENTION

Problems to be Solved by the Invention

In the case of performing control calculations according to a plurality of types of programs in different executable forms in order to control a plurality of controlled objects, variables used in each control calculation are generally appropriately set according to the control calculation. Hence, in a case where control calculations are performed by different control devices, when a control calculation by one of the control devices requires access to a variable used by another control device, communication processing for accessing the variable is required between the different control devices. As a result, in order to simultaneously control the plurality of controlled objects, it is necessary for a user to create programs that execute the control calculations for controlling the controlled objects according to the types of the programs, and a processing program related to variable (data) communication between both the programs (both the control devices).

Even in a case where control calculations are performed by a single control device, the control calculations according to a plurality of types of programs in different executable forms being performed in order to control a plurality of controlled objects, no specific configuration for exchanging a variable for calculation processing between the different types of programs is sufficiently considered. That is, in the related art, there is no sufficient consideration about, when different types of programs share a variable for control calculations, how to share the variable. Thus, even in the case where a single control device performs different controlled objects, the burden of creating programs on a user is not sufficiently reduced.

The present invention has been made in view of such problems, and an object of the present invention is to provide a technique capable of reducing the burden of creating programs on a user even in a case where a single control device performs control calculations according to a plurality of types of programs in different executable forms.

Means for Solving the Problem

The present invention employs, in order to solve the above problems, a configuration in which, while a single control device is able to execute a plurality of types of programs in different executable forms, a variable available for each program is retained on one program side, and another program accesses the variable via the one program. Employing this configuration makes management of the variable by a user easy, and reduces the burden of creating programs on the user.

Specifically, the present invention is a control device including a program according to a first executable form that is executed as a whole in each execution, and a program according to a second executable form that is sequentially executed, the control device including: a first processing unit configured to execute the program according to the first executable form to calculate a first command value for controlling a first controlled object in each control cycle determined in advance; a second processing unit configured to execute the program according to the second executable form to calculate a second command value for controlling a second controlled object in the each control cycle according to an intermediate code generated by an interpreter interpreting at least a part of the program; and an output unit configured to output the first command value and the second command value in the each control cycle. In the control device, one processing unit of the first processing unit and the second processing unit is configured to retain a predetermined variable available in both a calculation by the first processing unit and a calculation by the second processing unit, and the other processing unit of the first processing unit and the second processing unit is configured to access the predetermined variable via the one processing unit.

The control device includes the program according to the first executable form and the program according to the second executable form as programs in different types of executable forms. According to the former executable form, the program is executed as a whole in each execution, and according to the latter executable form, the program is sequentially executed. Since programs in different executable forms can be used in this manner, the user can appropriately select a program suitable for controlling a controlled object, and the convenience of the control device is improved.

The first processing unit executes the program according to the first executable form to calculate the first command value based on the program in each control cycle. The second processing unit is configured to calculate the second command value based on the program according to the second executable form in each control cycle according to the intermediate code generated through the interpretation by the interpreter. Then, the output unit outputs the first command value and the second command value, so that the respective command values based on the programs in different executable forms can be output in synchronization.

In the control device configured as described above, the one processing unit of the first processing unit and the second processing unit is configured to retain the predetermined variable used in both the calculation by the first processing unit and the calculation by the second processing unit. That is, the predetermined variable is used by both the processing units, but is retained by only the one processing unit. When the calculation by the other processing unit of the first processing unit and the second processing unit requires the predetermined variable, the other processing unit that does not retain the predetermined variable accesses the predetermined variable via the one processing unit that retains the predetermined variable. As a result, the other processing unit can also use the predetermined variable to achieve the own calculation. At this time, since the first processing unit and the second processing unit are formed in the single control device, it is not necessary for a user to prepare a program for controlling data exchange between the first processing unit and the second processing unit, and the burden on the user is reduced.

Here, as an example, the one processing unit may be the first processing unit, and the other processing unit may be the second processing unit. Alternatively, the one processing unit may be the second processing unit, and the other processing unit may be the first processing unit.

In the control device described above, the predetermined variable may have an identical variable name in the calculation by the one processing unit and the calculation by the other processing unit. In this case, the other processing unit may, when using the predetermined variable, use a value of a variable having the identical variable name to the predetermined variable in the one processing unit as a value of the predetermined variable. That is, the predetermined variable has the identical variable name in the one processing unit and the other processing unit, so that the predetermined variable is exchanged between both the processing units by using the variable name.

Alternatively, in the control device described above, the predetermined variable may have a first variable name in the calculation by the one processing unit and a second variable name in the calculation by the other processing unit, the first variable name and the second variable name being different, and correlation information defining a correlation between the first variable name and the second variable name may be retained. In this case, the other processing unit may, when using a variable having the second variable name as the predetermined variable, use a value of a variable having the first variable name associated with the second variable name based on the correlation information as a value of the predetermined variable That is, the predetermined variable has different variable names in the one processing unit and the other processing unit, but the correlation information related to the variable names is retained in the control device, so that the predetermined variable is exchanged between both the processing units based on the correlation information.

Effect of the Invention

Even in a case where a single control device performs control calculations according to a plurality of types of programs in different executable forms, it is possible to reduce the burden of creating programs on a user.

BRIEF DESCRIPTION OF THE DRAWINGS

FIG. 3 is a diagram illustrating a correlation between variables used in robot control and PLC control executed in the integrated controller.

MODE FOR CARRYING OUT THE INVENTION

Application Example

Figure 1:
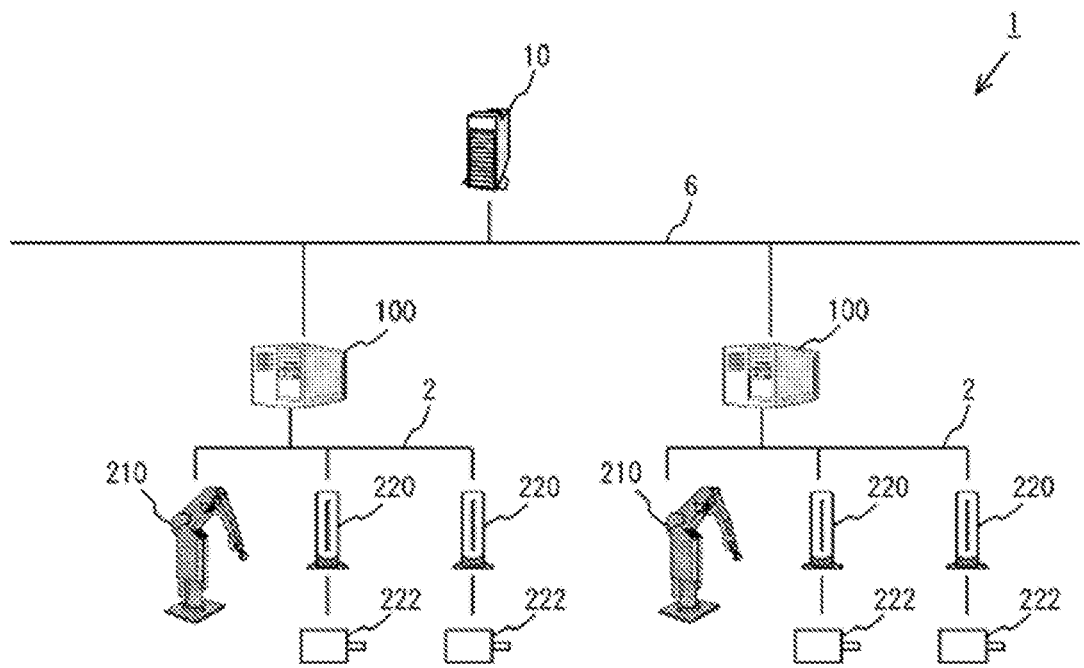
FIG. 1 is a diagram illustrating a schematic configuration of a control system including an integrated controller.
Figure 2:
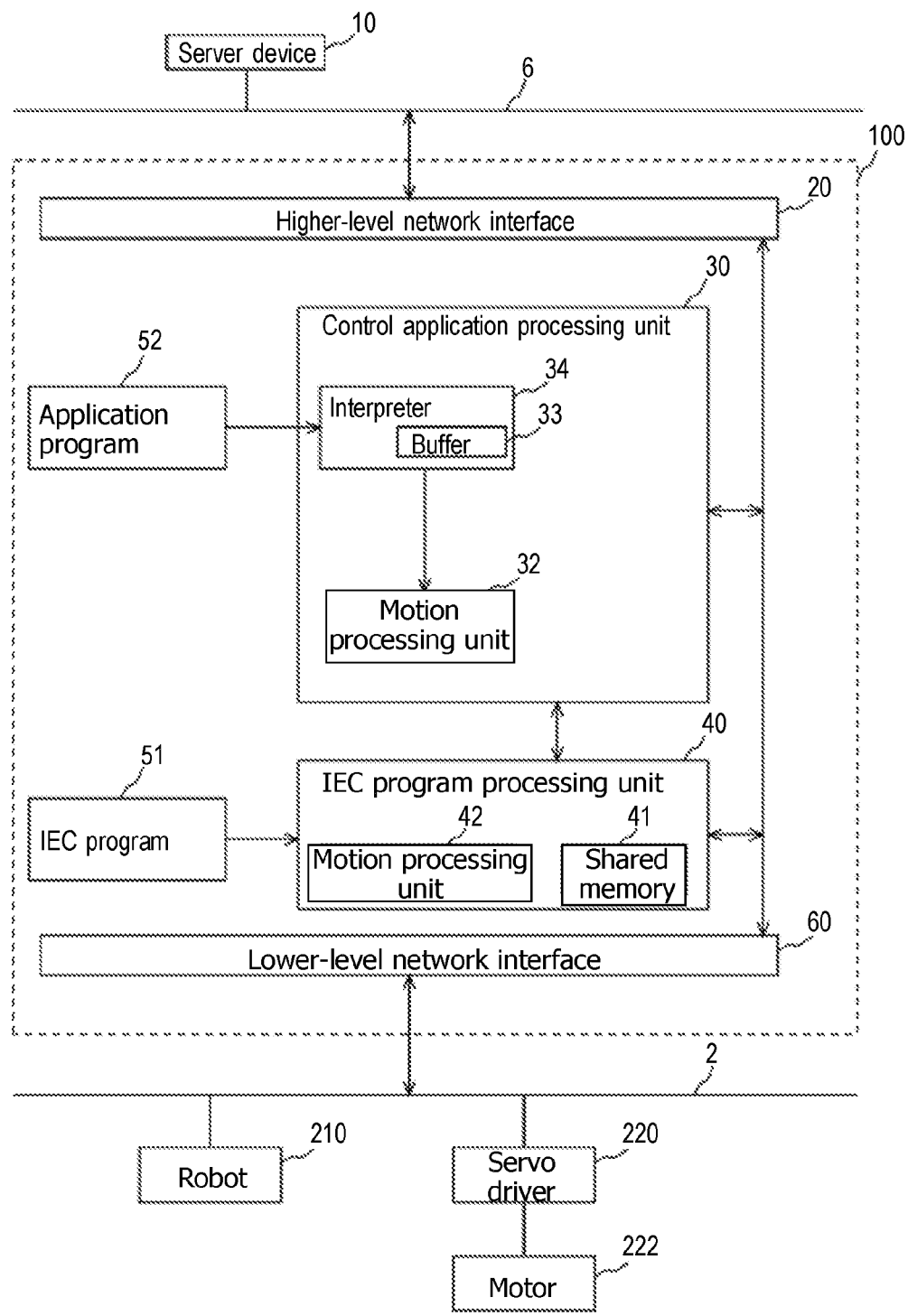
FIG. 2 is a functional block diagram showing functions of the integrated controller as an image.

An application example of a control device according to an embodiment will be described with reference to FIGS. 1 and 2. FIG. 1 is a schematic configuration diagram of a control system 1 to which a control device 100 is applied, and FIG. 2 is a diagram showing functional units formed in the control device 100 as an image.

The control device 100 corresponds to an industrial controller that controls controlled objects such as various facilities and devices. The control device 100 is a type of computer that executes control calculations as described later. The control device 100 may be connected to a variety of field equipment via a field network 2. The field equipment includes an actuator that physically acts in some way on a manufacturing device, a production line, or the like (hereinafter, also collectively referred to as "field"), an input/output device that exchanges information with the field, and the like. FIG. 1 illustrates a robot 210, a servo driver 220, and a motor 222 as field equipment. The servo driver 220 drives the motor 222 according to a command value (for example, a position command, a speed command, or the like) from the control device 100. Examples of the robot 210 include a parallel robot, a SCARA robot, and a multi-joint robot. As described above, the control device 100 is configured to integrally control the robot 210, the servo driver 220, and the motor 222, and details thereof will be described later.

The control device 100 exchanges data with at least one piece of the field equipment via the field network 2 and the like. The "field network" is also generally referred to as "field bus", but is consistently referred to as "field network" in the present application for simplicity of description. The control device 100 performs a process (input process) of collecting data (hereinafter, also referred to as "input data") collected or generated in the variety of field equipment, a process (calculation process) of generating data (hereinafter, also referred to as "output data") such as a command for the field equipment, a process (output process) of transmitting the generated output data to a target piece of the field equipment, and the like.

Here, the field network 2 preferably employs a bus or network for fixed-cycle communication ensuring data arrival time. As such a bus or network for fixed-cycle communication, EtherCAT (registered trademark) and the like are known. Then, data exchanged between the control device 100 and the field equipment via the field network 2 is updated in a very short cycle of the order of several hundreds of microseconds to several tens of milliseconds. Note that such a process of updating the exchanged data is also referred to as input/output refresh process.

The control device 100 is also connected to another device via a higher-level network 6. The higher-level network 6 may employ Ethernet (registered trademark) or EtherNet/IP (registered trademark), both being a general network protocol. More specifically, the higher-level network 6 may be connected to at least one server device 10. The server device 10 is assumed to be a database system, a manufacturing execution system (MES), or the like. The MES acquires information from manufacturing devices or facilities as the controlled object to monitor and manage the entire production, and can also handle order information, quality information, shipping information, and the like. The present invention is not limited to this configuration, and the higher-level network 6 may be connected to a device that provides an information system service.

Here, a configuration of the control device 100 will be described with reference to FIG. 2. The control device 100 is a type of computer that executes predetermined control calculations as described above, and includes a processor and memory necessary for the control calculations. The processor includes a central processing unit (CPU), a micro processing unit (MPU), a graphics processing unit (GPU), or the like. The processor may employ a configuration having a plurality of cores, or a plurality of processors may be arranged. The memory includes a volatile storage device such as a dynamic random access memory (DRAM) or a static random access memory (SRAM), a nonvolatile storage device such as a hard disk drive (HDD) or a solid state drive (SSD), or the like. The processor reads and executes various programs stored in the memory, thereby implementing control according to the controlled objects and various processes as described later. The memory stores, in addition to a system program for implementing basic functions, user programs (an IEC program 51 and an application program 52) created according to manufacturing devices or facilities as the controlled objects.

Note that the IEC program 51 in the present application is a program that is scanned as a whole in each execution to calculate at least one command value in each execution. The IEC program 51 typically includes a program including at least one instruction written according to the international standard IEC 61131-3 defined by the International Electrotechnical Commission (IEC). The IEC program 51 includes instructions for sequence control and motion control. The IEC program 51 corresponds to an executable form in which an entire program is executed (scanned) in each control cycle, and is suitable for control requiring immediacy and high speed. Meanwhile, the application program 52 in the present application is a control program for using a robot to perform specific processing or operation. The application program 52 includes a program including at least one instruction for implementing a robot control application, and is distinguished from the IEC program 51. The application program 52 related to robot control employs, for example, an interpretive method in which a program written in a robot language is sequentially executed line by line.

As illustrated in FIG. 2, the control device 100 includes a control application processing unit 30, an IEC program processing unit 40, a higher-level network interface 20, and a lower-level network interface 60. The lower-level network interface 60 mediates data exchange between each of the IEC program processing unit 40 and the control application processing unit 30 and the field equipment connected via the field network 2. The higher-level network interface 20 mediates data exchange between each of the IEC program processing unit 40 and the control application processing unit 30 and the server device 10 connected via the higher-level network 6. For example, the control device 100 receives instructions to start/end production from the server device 10 connected via the higher-level network 6. The server device 10 may transmit an application program for operating the control application, recipe information (information such as parameters suitable for production), and the like to the control device 100 in some cases.

The IEC program processing unit 40 executes (scans) the IEC program 51 to calculate at least one command value in each control cycle determined in advance. That is, the IEC program processing unit 40 calculates a command value in each control cycle according to the IEC program 51. In the present application, the IEC program 51 is executed to control a predetermined device including the motor 222. A motion processing unit 42 provides functionality of calculating a command value in each control cycle according to motion instructions included in the IEC program 51. That is, the motion instructions included in the IEC program 51 include instructions about behavior for a plurality of control cycles (for example, instructions that cause output of the predetermined device including the motor 222 to draw a certain track). When such motion instructions are executed, the motion processing unit 42 calculates a command value in each control cycle according to the instruction content of the executed motion instructions. That is, the motion processing unit 42 implements the behavior indicated by the motion instructions by outputting the command value to the predetermined device in each control cycle.

The IEC program processing unit 40 includes a shared memory 41. The shared memory 41 retains data (variable data) related to a predetermined variable used in a command value calculation process by the motion processing unit 42. Hence, the IEC program processing unit 40 accesses the shared memory 41 in a timely manner when calculating a command value for controlling the behavior of the predetermined device. In addition, the variable data retained in the shared memory 41 can also be accessed by the control application processing unit 30 described later, and details thereof will be described later. The shared memory 41 may store data other than the variable data for the command value calculation described above. For example, in the disclosure of the present application, the shared memory 41 stores a part or all of processing results from the IEC program processing unit 40, and the control application processing unit 30 can refer to the data stored in the shared memory 41 of the IEC program processing unit 40. Furthermore, the control application processing unit 30 may be able to write data to the shared memory 41 of the IEC program processing unit 40, and the motion processing unit 42 can refer to the data written by the control application processing unit 30 in this manner.

Next, the control application processing unit 30 calculates a command value for controlling the control application on the basis of the application program 52, the recipe information, and the like. In the present application, the application program 52 is executed by the control application processing unit 30 to control the robot 210. The control application processing unit 30 calculates and outputs a command value for the control application in synchronization with the command value calculation and output by the IEC program processing unit 40. That is, the control application processing unit 30 executes a command value calculation process for controlling the robot 210 in synchronization with the calculation process by the IEC program processing unit 40. Note that the synchronization processing between the IEC program processing unit 40 and the control application processing unit 30 will be described later. The control application processing unit 30 includes a motion processing unit 32, a buffer 33, and an interpreter 34 in order to implement the command value calculation synchronized with the command value calculation process by the IEC program processing unit 40.

The interpreter 34 sequentially interprets at least a part of the application program 52 to generate an intermediate code, and includes a buffer 33 that stores the generated intermediate code. The intermediate code in the present application conceptually includes instructions for calculating a command value in each control cycle, and may include at least one instruction or at least one function. The motion processing unit 32 calculates a command value in each control cycle according to the intermediate code generated and stored in the buffer 33 in advance by the interpreter 34. In general, instructions (code) written in the application program 52 are sequentially executed, and thus, a command value calculation cycle cannot be ensured. However, in the disclosure of the present application, using the intermediate code in this manner allows the motion processing unit 32 to calculate a command value in each control cycle. The instructions written in the intermediate code may use a coordinate system according to the control application.

Furthermore, the control application processing unit 30 can access the shared memory 41 in a timely manner for the motion processing unit 32 to perform the command value calculation process for controlling the robot 210 as necessary. For example, in a case where synchronous control of the predetermined device including the motor 222 and the robot 210 requires determining motion of the robot 210 in response to motion of the predetermined device, it is necessary to use variable data retained in the shared memory 41, the variable being related to the predetermined device in the calculation process by the motion processing unit 32. In such a case, the control application processing unit 30 accesses the shared memory 41 via the IEC program processing unit 40 and acquires the variable data.

A specific aspect of the variable data in the shared memory 41 by the control application processing unit 30 will be described. In a first mode, a variable name used in the command value calculation by the IEC program processing unit 40 and a variable name used in the command value calculation by the control application processing unit 30 are the same. In this case, when the motion processing unit 32 performs the calculation process in the control application processing unit 30, the control application processing unit 30 performs query processing that causes the IEC program processing unit 40 to return a value of the variable having the same variable name as the variable included in the application program 52. When the variable having the same variable name is retained in the shared memory 41, the queried IEC program processing unit 40 returns the variable data of the variable to the control application processing unit 30. As a result, the motion processing unit 32 continues the calculation process. When the variable having the same variable name is not retained in the shared memory 41, the IEC program processing unit 40 returns an error signal to the control application processing unit 30.

In a second mode, a variable name used in the command value calculation by the IEC program processing unit 40 and a variable name used in the command value calculation by the control application processing unit 30 are different. In addition, a table (see FIG. 3) defining a correlation between the variable name on the IEC program processing unit 40 side and the variable name on the control application processing unit 30 side is retained in the control application processing unit 30. In this case, when the motion processing unit 32 performs the calculation process in the control application processing unit 30, the control application processing unit 30 performs query processing that causes the IEC program processing unit 40 to specify the variable retained in the shared memory 41 ("variable on the IEC program processing unit side" in FIG. 3) corresponding to the variable included in the application program 52 ("variable on the control application processing unit side" in FIG. 3) and to return a value of the specified variable. The return after the query is the same as in the first mode.

Employing such a mode for sharing a variable for the command value calculation between the IEC program processing unit 40 and the control application processing unit 30 via the shared memory 41 eliminates the need for a user to prepare an additional program for controlling data exchange between the IEC program processing unit 40 and the control application processing unit 30 in the synchronous control of the predetermined device and the robot 210. Therefore, the burden on the user is reduced.

<Synchronous Execution of Programs>

The control device 100 implements synchronous execution of the IEC program 51 and the application program 52. The interpreter 34 of the control application processing unit 30 sequentially executes the application program 52 in each cycle longer than the control cycle, for example, twice the control cycle. However, both the motion processing unit 42 of the IEC program processing unit 40 and the motion processing unit 32 of the control application processing unit 30 calculate respective command values in each the same control cycle. Thus, the control device 100 outputs both the command values in synchronization in the control cycle determined in advance. As described above, the IEC program processing unit 40 and the control application processing unit 30 include the respective motion processing units for continuously controlling motion of actuators. These motion processing units calculate respective command values in synchronization, allowing executing both the control according to the IEC program 51 and the control according to the application program 52 in synchronization with the control cycle, thereby realizing precise control in units of control cycles.

Figure 4:
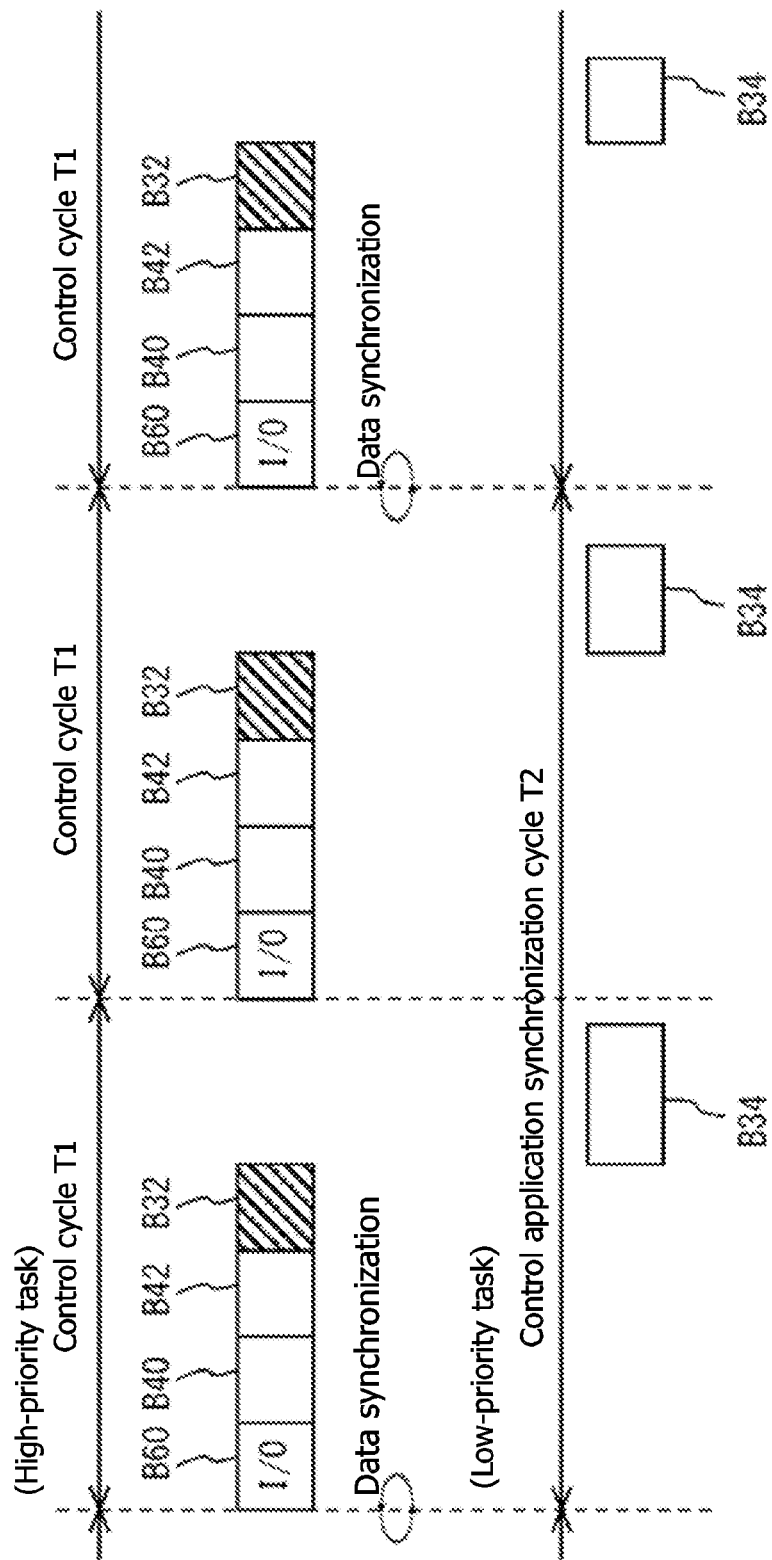
FIG. 4 is a diagram illustrating a flow of processes executed according to a control cycle in the integrated controller.

Next, details of execution timings of the IEC program 51 and the application program 52 in the control device 100 will be described with reference to FIG. 4. FIG. 4 is a diagram illustrating execution timings of the programs in the control device 100 as an example. Note that, in the control device 100, a task having higher priority (processes in the upper part of FIG. 4) and a task having lower priority (a process in the lower part of FIG. 4) are set as a high-priority task and a low-priority task, respectively, in consideration of resources of the processor. Specifically, the execution by the lower-level network interface 60, the IEC program processing unit 40, the motion processing unit 42 of the IEC program processing unit 40, and the motion processing unit 32 of the control application processing unit 30 is set as high-priority tasks, and the execution by the interpreter 34 of the control application processing unit 30 is set as a low-priority task.

That is, processes executed as the high-priority tasks include an input/output refresh process B60 related to the lower-level network interface 60, an IEC program 51 execution process B40, a command value calculation process B42 performed by the motion processing unit 42 according to the IEC program 51, and a command value calculation process B32 performed by the motion processing unit 32 according to the application program 52. Meanwhile, a process B34 of sequentially interpreting the application program 52 is executed as the low-priority task.

Here, the high-priority tasks are executed repeatedly in each control cycle T1 determined in advance. The low-priority task is executed whenever the high-priority tasks are not executed in each control cycle. That is, each control cycle includes execution time assigned for the high-priority tasks, and the low-priority task is executed at a time other than the execution time for the high-priority tasks.

First, the high-priority tasks will be described. When each control cycle arrives, the input/output refresh process B60 is executed, and then the IEC program processing unit 40 executes (scans) the whole IEC program 51 to calculate at least one command value for the sequence control (execution process B40). At the same time, the motion processing unit 42 executes motion processing related to the motion instructions included in the IEC program 51 to calculate at least one command value for the motion instructions (execution process B42). Furthermore, the motion processing unit 32 of the control application processing unit 30 prepares a motion command for controlling the robot 210 according to an intermediate code stored in the buffer 33 (execution process B32). Hereinafter, similar processes are repeated in each control cycle. Note that each control cycle may not always include a timing at which the motion processing unit 32 reads an intermediate code from the buffer 33. In a case where a read intermediate code includes instructions allowing for calculating command values for a plurality of control cycles T1, the intermediate code may be read at a time in the plurality of control cycles T1.

Upon completing the execution of the high-priority tasks in a certain control cycle in this manner, there is prepared a set of respective command values for the sequence control and the motion control thereof related to the motor 222 and the like and a command value for the control application related to the robot 210. These command values are basically reflected on the field side when the next control cycle arrives. That is, the IEC program processing unit 40 and the control application processing unit 30 calculate command values depending on input data in the same control cycle, so that output synchronized with the input can be realized.

Meanwhile, regarding the low-priority task, the interpreter 34 of the control application processing unit 30 sequentially executes the application program 52. That is, the interpreter 34 reading and analyzing the application program 52 has lower priority. An intermediate code generated by the interpreter 34 analyzing the application program 52 is sequentially stored in the buffer 33 while the capacity of the buffer 33 is considered. The motion processing unit 32 of the control application processing unit 30 sequentially refers to the intermediate code stored in the buffer 33 to use it for generating a command value in the calculation process B32. At this time, the interpreter 34 generates in advance an extra intermediate code corresponding to an integer multiple of the control cycle that is a calculation cycle of the high-priority tasks, so that the motion processing unit 32 can calculate a command value for the control application in each control cycle without being affected by the intermediate code generation.

In addition, the interpreter 34 temporarily stops interpreting the application program 52 before arrival of a control application synchronization cycle (an integer multiple of the control cycle) determined in advance. At the timing of the temporary stop, data is synchronized between the IEC program processing unit 40 and the control application processing unit 30, resulting in sharing of consistent data therebetween. In this manner, the interpreter 34 updates the data shared with the IEC program processing unit 40 in each synchronization cycle. In addition to the update of the shared data, input data acquired from the field side and output data may also be updated (data synchronization may be performed). This allows the control application processing unit 30 to also use the data acquired by the IEC program processing unit 40, to control the robot 210. The control application synchronization cycle may have any length as long as it is set to an integral multiple of the control cycle. The control application synchronization cycle is appropriately set according to control accuracy and the like required in the control application.

Figure 5:
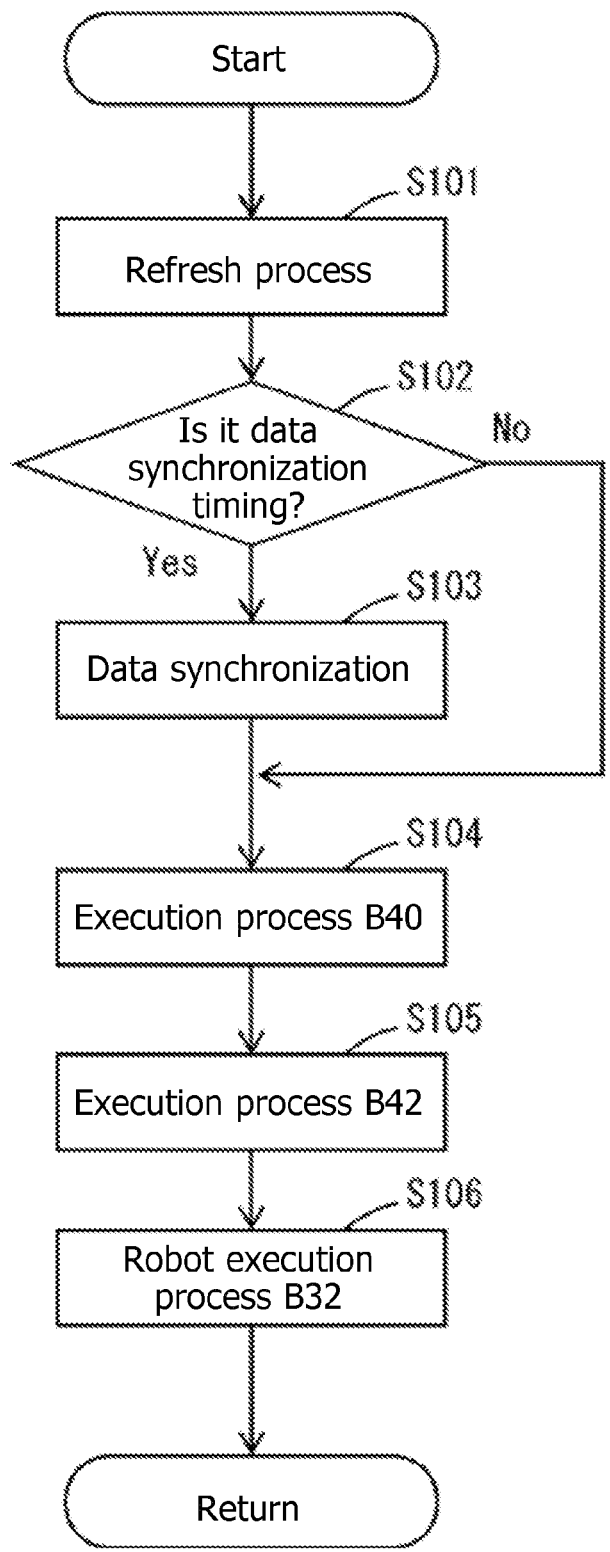
FIG. 5 is a first flowchart related to the robot control executed in the integrated controller.

Next, a flow of processing of the field equipment (the robot 210 and the motor 222) by the control device 100 will be described with reference to FIGS. 5 and 6. FIG. 5 is a flowchart related to the processes of the high-priority tasks described above, and FIG. 6 is a flowchart related to the processes of the low-priority tasks described above.

First, a processing flow of the high-priority tasks will be described. When a control cycle T1 arrives, the lower-level network interface 60 executes the input/output refresh process (processing in S101). As a result, command values (command values resulting from B40, B42, B32, and the like) calculated in the immediately preceding control cycle T1 are output to the actuators and the like of the field equipment, and input data from the field equipment is acquired. Subsequently, in S102, it is determined whether the current control cycle corresponds to a data synchronization timing. When the determination is affirmative, data synchronization is executed between the IEC program processing unit 40 and the control application processing unit 30 (processing in S103). When the determination is negative in S102, the processing proceeds to S104.

Next, in S104, the above-described execution process B40 is performed, and subsequently, in S105, the above-described execution process B42 is performed. Thereafter, in S106, the above-described robot execution process B32 is performed to prepare a motion command for controlling the robot 210. When the robot execution process B32 is performed, in a case where the application program 52 includes a predetermined variable, a value of a corresponding variable retained in the shared memory 41 is used according to the first or second mode described above.

The command values calculated and prepared by the sequential processing of the high-priority tasks illustrated in FIG. 5 are output to the field when the next control cycle T1 arrives. Then, the low-priority task is executed as illustrated in FIG. 6 in a period between the end of the sequential processing and arrival of the next control cycle T1.

A processing flow of the low-priority task will be described with reference to FIG. 6. The low-priority task relates to the process of interpreting the application program 52 by the interpreter 34. First, in S201, the control application processing unit 30 determines whether an intermediate code remains in the buffer 33. The determination is made in order to avoid generating an intermediate code exceeding the capacity of the buffer 33. When the determination is affirmative in S201, the low-priority task is terminated, and when the determination is negative, the processing proceeds to S202. In S202, the interpreter 34 reads a part of the application program 52. For example, one line of code constituting the application program 52 is read. In S203, the interpreter 34 interprets the read code to generate an intermediate code. The generated intermediate code is stored in the buffer 33 in S204. Note that, without an application program to be executed, the processing in S202 to S204 is not performed, and as a result, no intermediate code is stored in the buffer 33. The low-priority task having such sequential processing is repeated for a period of program execution time assigned for the low-priority task.

Figure 6:
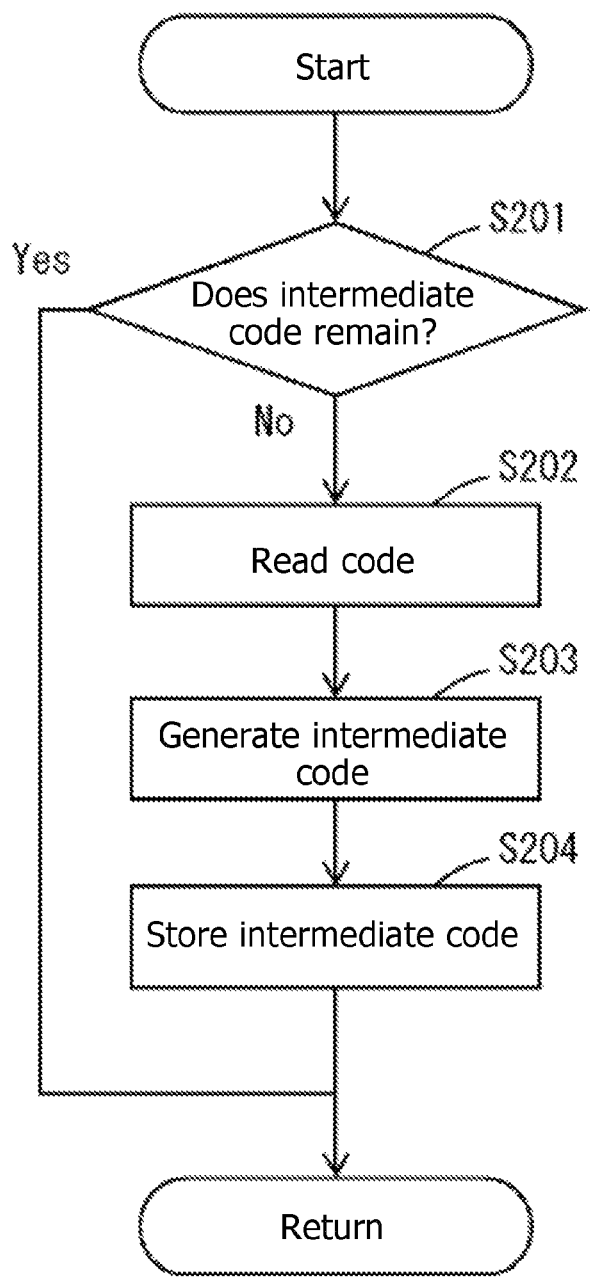
FIG. 6 is a second flowchart related to the robot control executed in the integrated controller.

By performing the sequential processing illustrated in FIGS. 5 and 6 in this manner, the IEC program 51 and the application program 52 are executed at the execution timings illustrated in FIG. 4 in the control device 100.

<Supplementary Note 1>

A control device (100) including a program (51) according to a first executable form that is executed as a whole in each execution, and a program (52) according to a second executable form that is sequentially executed, the control device including:

a first processing unit (40) configured to execute the program (51) according to the first executable form to calculate a first command value for controlling a first controlled object (222) in each control cycle determined in advance;

a second processing unit (30) configured to execute the program (52) according to the second executable form to calculate a second command value for controlling a second controlled object (210) in the each control cycle according to an intermediate code generated by an interpreter (34) interpreting at least a part of the program; and an output unit (60) configured to output the first command value and the second command value in the each control cycle; wherein one processing unit of the first processing unit (40) and the second processing unit (30) is configured to retain a predetermined variable available in both a calculation by the first processing unit (40) and a calculation by the second processing unit (30), and the other processing unit of the first processing unit (40) and the second processing unit (30) is configured to access the predetermined variable via the one processing unit.

DESCRIPTION OF SYMBOLS

2 field network
6 higher-level network
10 server device
30 control application processing unit
40 IEC program processing unit
51 IEC program
52 application program
100 control device
210 robot
220 servo driver
222 motor

The invention claimed is:

1. A control device comprising a memory storing a first program that is executable according to a first executable form in which the first program is executed in its entirety in each execution and a second program that is executable according to a second executable form in which the second program is sequentially executed, the control device comprising:

a first processing unit configured to execute the first program in its entirety to calculate a first command value for controlling a first controlled object in each control cycle determined in advance;

a second processing unit configured to execute the second program to calculate a second command value for controlling a second controlled object in the each control cycle according to an intermediate code generated by an interpreter interpreting at least a part of the second program; and an output unit configured to output the first command value and the second command value in the each control cycle, wherein the first processing unit is configured to retain a predetermined variable used in both a calculation by the first processing unit and a calculation by the second processing unit, and the second processing unit is configured to access the predetermined variable via the first processing unit.

2. The control device according to claim 1, wherein the predetermined variable has an identical variable name in the calculation by the first processing unit and the calculation by the second processing unit, and the second processing unit is configured to, when using the predetermined variable, use a value of a variable having the identical variable name to the predetermined variable in the first processing unit as a value of the predetermined variable.

3. The control device according to claim 1, wherein the predetermined variable has a first variable name in the calculation by the first processing unit and a second variable name in the calculation by the second processing unit, the first variable name and the second variable name being different, correlation information defining a correlation between the first variable name and the second variable name is retained, and the second processing unit is configured to, when using a variable having the second variable name as the predetermined variable, use a value of a variable having the first variable name associated with the second variable name based on the correlation information as a value of the predetermined variable.

* * * * *